Aug. 19, 1941.   H. S. ALCORN   2,253,260
HYDRAULIC BRAKE SAFETY SIGNAL
Filed Aug. 28, 1939
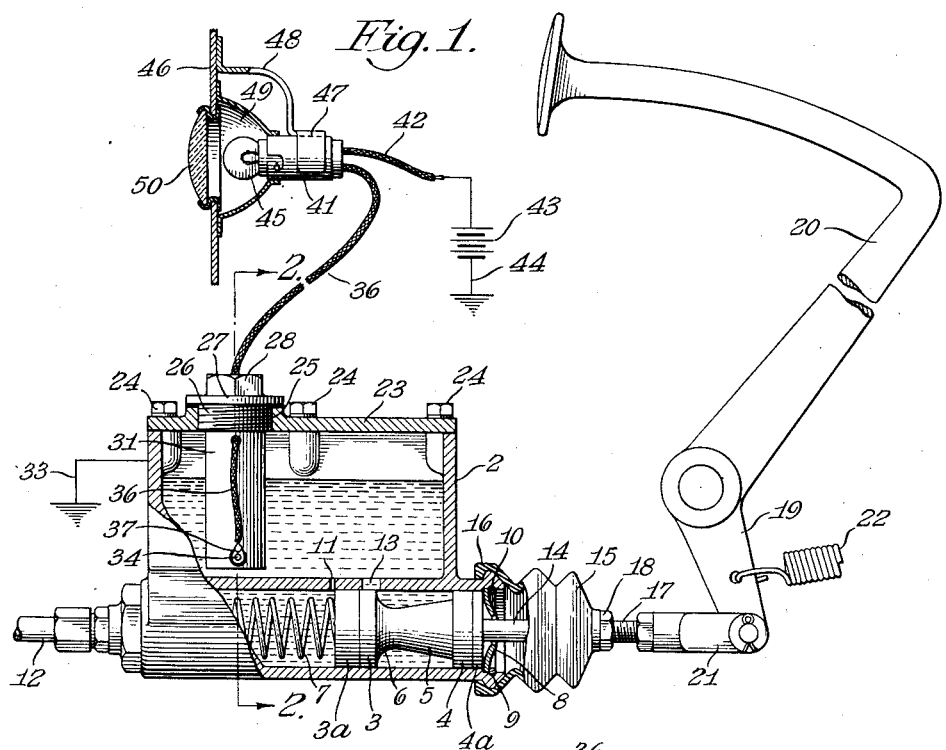
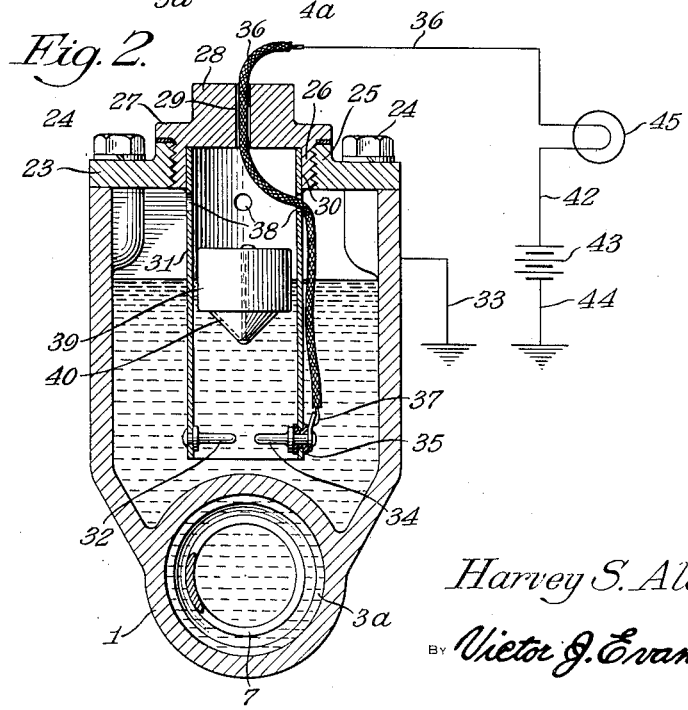
Harvey S. Alcorn.
INVENTOR
BY Victor J. Evans & Co.
ATTORNEYS Patented Aug. 19, 1941

2,253,260

UNITED STATES PATENT OFFICE 2,253,260

HYDRAULIC BRAKE SAFETY SIGNAL

Harvey S. Alcorn, Bethany, Okla.

Application August 28, 1939, Serial No. 292,364

1 Claim. (Cl. 200—84)

This invention relates to hydraulic brake systems and particularly to a safety provision including signal means operating automatically when the liquid in the reserve reservoir of the system drops to a predetermined level and giving notice of such occurrence to the operator of the automobile or other vehicle equipped with such brake system.

The invention consists in the novel float controlled circuit closing device as applied to the reserve reservoir and in the particular parts and arrangements thereof in connection with an indicator or signal element as hereinafter described and claimed, reference being had to the accompanying drawing illustrating a practical adaptation of the invention, in which—

Figure 1 is a view partly in side elevation and partly in section, illustrating the general application of the safety device to a conventional hydraulic brake system; and Figure 2 is a cross section, on an enlarged scale, taken substantially on the line 2—2 of Figure 1.

Referring now to the drawing in detail, the numeral 1 indicates a conventional master cylinder of a hydraulic brake system, said cylinder having a reserve reservoir 2 formed integrally therewith and disposed above and extending longitudinally thereof in the usual manner. Within the cylinder 1 is a reciprocatory piston having a working head 3 provided with a cupped member 3a on its outer end face and a follower head 4 connected to the working head 3 by a reduced neck 5, said neck 5, as shown, tapering throughout its length from the follower head 4 towards the working head 3 and merging with the latter with a rounded fillet 6, said follower head 4 also having a cupped member 4a on its outer end face.

The piston is yieldably held in normally retracted position at one end of the cylinder 1 by a spring 7 which is interposed between the working head 3 of the piston and the opposite end of the cylinder, in which position the follower head 4 of the piston abuts a dished washer 8 which is set in the adjacent open end portion of the cylinder and held in place by a conventional, resilient, split retaining ring 9 inserted in an annular groove 10 provided therefor in the cylinder wall next adjacent the washer.

The cylinder 1 is provided with a restricted port opening 11 establishing direct communication between the cylinder and the reserve reservoir 2, this port being uncovered when the piston is in its normally retracted position but is first covered and then cut off from communication with the cylinder ahead of the working head 3 of the piston when the latter is moved from normal position to displace the liquid ahead thereof from the cylinder and through the tubular connection 12 which leads from the cylinder to the brake-setting means (not shown) and thus create the hydrostatic pressure in the system to effect the setting of the brakes in the usual manner. Another port 13, of greater area than the restricted port 11, is provided to establish communication constantly between the reserve reservoir 2 and the space in the cylinder between the working head 3 and follower head 4, said port 13 being partially covered by the working head 3 of the piston in the normal position of the latter but being uncovered and fully open when the piston is moved in the direction for setting the brakes. The space between the piston heads 3 and 4 is thus constantly filled with the liquid from the reservoir 2, thereby practically effecting a seal which prevents the entrance of air as well as equalizing and balancing the liquid pressure at that side of the working head 3 of the piston.

As shown, the piston is provided with a stem 14 extending axially therefrom through the central opening in the washer 8 and also through a conventional bellowslike protector 15 which is attached at its inner end to an external annular collar on the end portion of the cylinder 1, as at 16, the outer end of the protector being fitted and tightened on the screw-threaded outer portion 17 of the stem 14 by a jam nut 18. The extreme outer end portion of the stem 14 is connected in the usual manner to the arm 19 of a conventional foot lever 20 by a conventional coupling 21. As shown, the foot lever 20 is provided with the usual spring element 22 for yieldably holding it in its normal position and returning it to such position when released from foot pressure after actuation, this spring element also functioning to some degree in the return of the piston to its normal position in the cylinder 1, due to the aforesaid connection between the arm 19 of the foot lever and the piston, but the spring 7 within the cylinder effecting a more positive movement of the piston back to its normal position in abutting contact against the washer 8 and thus compensating for all lost motion that might obviously occur in the connection between the piston and the arm 19 of the foot lever.

All of the foregoing enters only coincidentally with the present invention and per se is not a part of the invention but may be modified considerably as far as the present invention is concerned.

The present invention comprehends the broad application of a unitary float-controlled electrical circuit closing unit insertable in the reserve reservoir 2 but more particularly in connection with the cap or closure member of the filling opening of the reservoir. As shown, the reservoir 2 is provided with a conventional cover plate 23 which is detachably secured thereto by the usual screws or bolts 24. For the purposes of the present invention, the cover plate 23 is provided with a screw-threaded filling opening 25 to receive a counterpart externally screw-threaded reduced pin portion 26 of a closure plug 27 which may be formed at its outer end with a conventional nut extension 28 or otherwise provided for the reception of a wrench or other instrumentality in applying the plug and removing it from the opening 25 in the cover plate.

As shown, the plug 27 is provided with a restricted axial bore 29 extending some distance inwardly from its outer end and terminating in an enlarged circular recess 30 in the pin portion of the plug, in which latter the open upper end portion of a cylindrical tubular member 31 is fitted tightly and fastened so as to be rigidly supported from the plug. The member 31 extends dependingly from the plug 27 with its lower open end terminating in a plane just above the master cylinder and is provided just within its lower end portion with a diametrically opposed pair of radial terminal contact studs of an electrical circuit, one of said studs, designated by the numeral 32, being secured in direct electrical contact with the adjacent wall portion of the tube 31, and said tube 31 being of electrical conductivity together with the body of the reservoir 2 and the connecting cover plate 23 therebetween and grounded conventionally as indicated at 33 in diagram in both Figures 1 and 2. The opposed terminal contact stud, designated by the numeral 34, is insulated from the tubular member 31 in its supporting attachment thereto, this insulated contact member 34 having the end of an insulated circuit wire 36 attached thereto, as at 37, said wire 36 being carried up from the contact member outside the tubular member 31, thence into said tubular member through one of a series of apertures 38 provided in the wall of said member 31 just below the cover plate 23 and then out through the restricted axial bore 29 of the closure plug 27, it being here noted that the restricted axial bore 29 is of slightly larger diameter than the wire 36 so as not to be entirely closed by the passage of the wire therethrough, whereby the bore serves as an air vent for the reserve reservoir 2, and it being here further pointed out that the series of apertures 38 in the upper portion of the tubular member 31 afford ample intercommunication between the interior of said tubular member 31 and the surrounding space in the reservoir 2, whereby the liquid is always at the same level in both the reservoir proper and said tubular member.

Located within the tubular member 31 is a float 39 comprising a cylindrical body which may be either made solid and of cork or other suitable buoyant material or made hollow and of metal or other material suitable for the purpose, said float of whatever material and major body construction having a conical hollow metal extension 40 at its lower end and of electrical conductivity so as to close the electrical circuit when the liquid in the reservoir 2 falls to a certain level and said end extension 40 of the float is brought into cross-connecting engagement with the two contact studs 32 and 34.

From the closure plug 27 the circuit wire 36 leads to a conventional lamp socket 41 from which the circuit is completed by a wire 42 leading from the socket to one pole of a battery or terminal of a conventional source of electrical energy, indicated diagrammatically at 43, the opposite pole or terminal of which is grounded, as at 44. Obviously, the socket 41 may be mounted in any convenient location where the light from a lamp bulb 45 therein is readily observed by the operator of the automobile or other vehicle to which the device of the present invention is incorporated in the brake system thereof, preferably on the instrument board as conventionally shown at 46 in Figure 1 of the drawing. As illustrated, the lamp socket 41 is supported by a clip or like holder 47 provided at the end of a supporting bracket 48 secured to the instrument board 46, and the end of the socket 41 being received in a central opening in the bottom of a cupped housing 49 placed over an opening in the instrument board and serving as a reflector as well as encasing the lamp bulb, and the opening being covered by a lens 50 obviously of a distinctive signaling color.

By the foregoing it is apparent that a simple and compact yet practical and efficient unitary liquid level indicating device is provided which is applicable to the liquid reserve reservoir of a hydraulic brake system without any alteration whatever in the reservoir structure itself but by the mere substitution of the float-controlled circuit closing unit for the regular closure cap or plug of the filling opening and by the use of which a warning is given immediately upon the liquid in the reservoir dropping to a predetermined minimum level and upon the occurrence of which the liquid supply may be promptly replenished, thus avoiding the danger incidental to depletion of the liquid supply and at the same time minimizing the possibility of air entering the hydraulic system, the occurrence of which is also a detrimental factor in the operation of hydraulic brake systems.

While the structure illustrated in the drawing embodies a practical adaptation of the invention it is obvious that considerable modification may be made therein without departing from the spirit and scope of the invention as defined in the appended claim. The invention, therefore, is not limited to the specific construction and arrangement shown.

What is claimed is:

The combination with the reserve supply reservoir of a hydraulic brake system, of an enlarged filling plug in the upper end of the reservoir and removable therefrom, said plug having an enlarged recess in its lower face communicating with a vertical passage extending through the upper end of the plug, a tubular member removably secured in said recess and extending adjacent the lower end of the reservoir and provided with an open lower end, contact studs carried by opposite walls of the tubular member, an electric wire connected to one of the studs on the outside of the tubular member and extending inwardly through an opening therein and passing outwardly through the vertical passage in the enlarged filling plug, and a float in said tubular member adapted to engage the contact studs for closing the circuit between the same.

HARVEY S. ALCORN.